United States Patent [19]

Hoekje et al.

[11] 4,190,638
[45] Feb. 26, 1980

[54] PRODUCTION OF HYPOCHLOROUS ACID

[75] Inventors: Howard H. Hoekje, Corpus Christi, Tex.; Russell R. May, Wadsworth, Ohio

[73] Assignee: PPG Industries, Inc., Pittsburgh, Pa.

[21] Appl. No.: 913,402

[22] Filed: Jun. 7, 1978

[51] Int. Cl.² .......................................... C01B 11/04
[52] U.S. Cl. .................................... 423/473; 423/190
[58] Field of Search ............... 423/422, 425, 427, 462, 423/473, 166, 190

[56] References Cited

U.S. PATENT DOCUMENTS

| | | | |
|---|---|---|---|
| 2,157,524 | 5/1939 | Cady | 423/462 |
| 2,383,674 | 8/1945 | Osborne | 423/422 |
| 3,914,397 | 10/1975 | Mueller | 423/462 |

Primary Examiner—O. R. Vertiz
Assistant Examiner—Thomas W. Roy
Attorney, Agent, or Firm—Edward J. Whitfield

[57] ABSTRACT

An aqueous hypochlorous acid production process is disclosed wherein the precipitate formed upon carbonating electrolytic cathode cell liquor is contacted in a fluidized bed with a mixture of gaseous chlorine and water vapor and the exit gas from the fluidized bed is absorbed in water.

6 Claims, 1 Drawing Figure

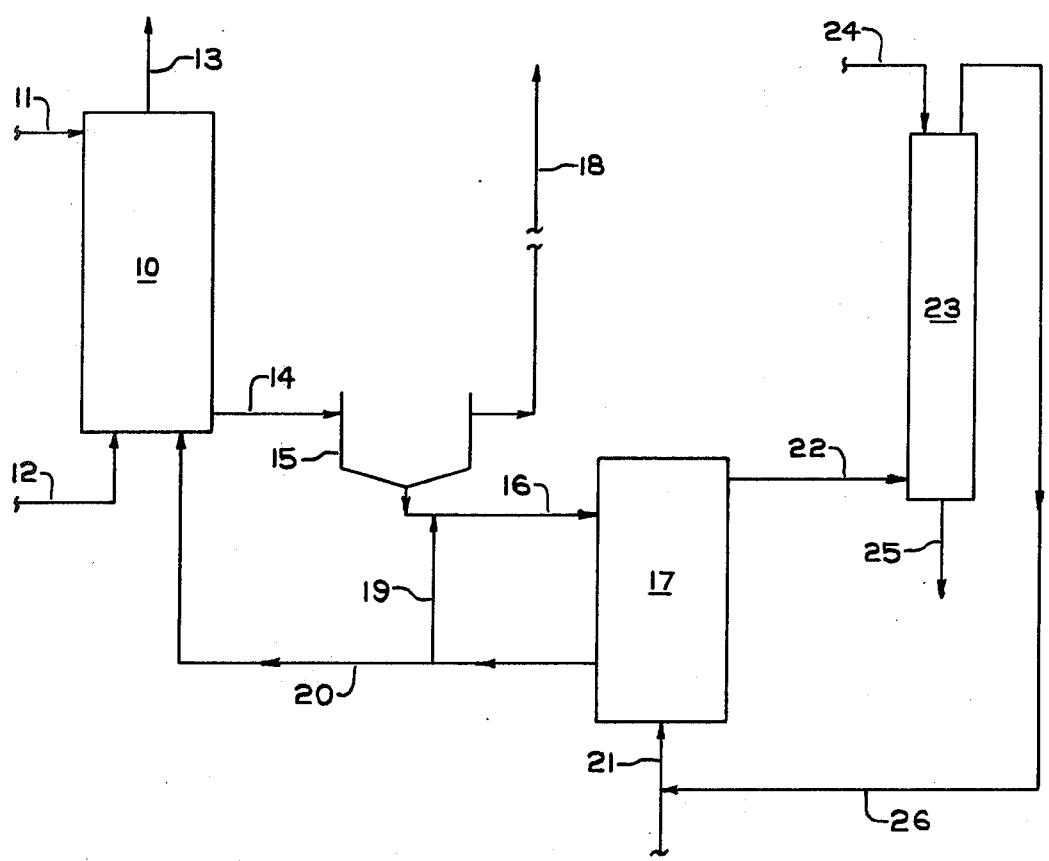

PRODUCTION OF HYPOCHLOROUS ACID

BACKGROUND OF THE INVENTION

In the diagram cell electrolysis of brine, chlorine gas is generated at the anode and an aqueous solution containing about 9 to 11 percent by weight sodium hydroxide and from about 12 to 15 percent by weight sodium chloride, along with trace amounts of sodium chlorate, is typically produced at the cathode. The cathode cell liquor is usually concentrated, by evaporation, to about 50 percent by weight sodium hydroxide, and the sodium chloride, only about 1 percent by weight of which is soluble in 50 percent caustic, is recovered and recycled to the brine feed.

Applicants have devised an alternative use for cathode cell liquor wherein the cell liquor is utilized as a starting material for the continuous production of aqueous hypochlorous acid which is known to have excellent bleaching properties.

SUMMARY OF THE INVENTION

The precipitate formed upon carbonating cathode cell liquor is contacted, in a fluidized bed, with a mixture of gaseous chlorine and water vapor and the gaseous effluent from the fluidized bed is absorbed in water to produce aqueous hypochlorous acid.

DESCRIPTION OF THE DRAWING

The drawing is a simplified schematic flow sheet illustrating a preferred embodiment of the process of the invention.

DESCRIPTION OF THE INVENTION

With reference to the flow sheet, cathode cell liquor is fed via line 11 to the top of carbonator 10 wherein the cell liquor is counter-currently contacted with carbon dioxide gas or a carbon dioxide containing gas fed via line 12 into the bottom of the carbonator. The carbon dioxide containing gas may be derived from any suitable source, e.g., flue gas. Upon carbonation, the sodium hydroxide in the cell liquor is converted to a solid, insoluble hydrated sodium carbonate-sodium bicarbonate which is believed to aproximate the composition of sodium sesquicarbonate, $Na_2CO_3.NaHCO_3.2H_2O$. Depleted carbon dioxide gas is vented from the carbonator via line 13. Carbonated cell liquor is withdrawn from the carbonator via line 14 and fed to a liquid-solid separating means such as centrifuge 15 wherein the solid sesquicarbonate is separated from the mother liquor and fed by, for example, a screw feeder 16 to a fluid bed reactor 17. The mother liquor or concentrate, which is essentially an aqueous sodium chloride solution, is withdrawn via line 18 and may be mixed with the brine feed to the electrolytic cells (not shown).

Since it is difficult to both feed as well as fluidize the wet sesquicarbonate, the same is mixed with dry recycle via line 19 from the fluidized bed 17 and the mixture is then fed via screw feeder 16 to the fluid bed reactor. It has been found that at least about 2 parts by weight of dry bed recycle to about 1 part by weight of wet sesquicarbonate produces an easily transportable and fluidizable feed. In addition, a portion of dry bed material containing unreacted alkali values may be recycled via line 20 to the carbonator 10 which recycle has been found to enhance the rate of cell liquor carbonation. Although the weight ratio of cell liquor to dry bed recycle may vary over a wide range, satisfactory results obtain at a weight ratio of cell liquor to dry bed recycle of from about 2.5:1 to about 10:1 and preferably about 5:1.

In the fluid bed reactor, the sesquicarbonate is contacted with a countercurrent flow of gaseous chlorine and water vapor fed via line 21. Chlorine monoxide gas is removed from the top of the fluid bed reactor and introduced via line 22 at the bottom of absorber 23 wherein it is contacted with a countercurrent flow of water fed via line 24. The chlorine monoxide gas is absorbed in the water and liquid hypochlorous acid is withdrawn from the absorber via line 25. Unreacted chlorine may be recycled via line 26 to the gaseous feed to the fluid bed reactor. In order to obtain acceptable chlorine conversion and to produce acceptable yields of hypochlorous acid, it has been found that the chlorine gas stream fed to the fluid bed reactor contain a certain amount of moisture. More particularly, to optimize chlorine recovery as hypochlorous acid, the molar ratio of water vapor to chlorine gas in the gaseous feed to the fluidized bed should be maintained within the range of about 0.5 to 0.9 and preferably about 0.6 to 0.8. Too low a water vapor to chlorine molar ratio results in unacceptable recovery of chlorine values, while too high a molar ratio of water vapor to chlorine will reduce the efficiency of the fluidized bed causing it to set up and will also result in unacceptable low yields of hypochlorous acid. The success of the reaction depends on water vapor being fed along with the chlorine gas regardless of the moisture content of the solid feed.

In a typical practice of the invention, about 5,653 parts by weight of cell liquor containing about 10.5 percent sodium hydroxide and about 15 percent sodium chloride is continuously fed to the carbonator 10 wherein it is contacted with an upflowing stream of about 737 parts by weight carbon dioxide gas. About 4,786 parts by weight of carbonated mixed liquor is continuously withdrawn from carbonator 10 and fed to centrifuge 15. About 1,211 parts by weight of wet solids is withdrawn from centrifuge, mixed with about 2,128 parts by weight of dry material from the fluid bed reactor 17, and the mixture fed via screw feeder 16 to the fluid bed reactor. About 1,064 parts by weight of dry material from the fluid bed reactor is continuously recycled to the carbonator 10. The wet solids withdrawn from centrifuge 15 contain about 42.5 percent sodium carbonate ($Na_2CO_3$), 33.6 percent sodium bicarbonate ($NaHCO_3$), 5 percent sodium chloride (NaCl), and the balance water. The dry bed material contains about 56 percent NaCl, 29 percent $NaHCO_3$, 14 percent $Na_2CO_3$, and the balance sodium chlorate ($NaClO_3$).

An upwardly flowing gaseous stream containing about 930 parts by weight chlorine and 950 parts by weight water is contacted with the solid material in the fluidized bed reactor. The gas mixture is fed at a sufficient rate so as to adequately fluidize the solids and to assure intimate contact between the solids and the gas mixture.

Exit gas from the fluid bed reactor is fed into the bottom of the absorber 23 wherein it is contacted with a downwardly flowing stream of water. About 2,000 parts by weight of 73 percent hypochlorous acid is withdrawn from the absorber. Although only one absorber is shown, two or more absorbers may be connected in series.

Since all items of apparatus used in the practice of the process of the invention, i.e., the carbonator, centrifuge, fluid bed reactor, absorber, and ancillary apparatus, are conventional, details of construction, size, operation, and the like are omitted since such are well within the skill of the art.

The invention is further illustrated by the following example.

EXAMPLE

Cell liquor containing 202 grams per liter sodium chloride and 133 grams per liter sodium hydroxide was carbonated with simulated stack gas containing about 14 percent carbon dioxide at a rate of 300 cubic centimeters per minute of gas per liter of cell liquor to produce, after centrifugation, about 142 grams per liter of cell liquor of a wet precipitate containing about 3.35 percent NaCl, 42.96 percent $Na_2CO_3$, 20.4 percent $NaHCO_3$, and the balance water. From the analysis and appearance of the solid product recovered from the cell liquor carbonation, it appeared that the solid product was sodium sesquicarbonate.

The solids were transferred to a feed hopper made from a one liter capacity glass separating funnel. The lower or outlet end of the feed hopper communicated with a screw feeder constructed from a 12.7 mm diameter, 20.3 cm long titanium screw having flights 12.7 mm apart disposed in a 17 mm diameter glass tube. The screw was operatively connected with a variable speed electric motor. The solids were continuously fed from the feed hopper via the screw feeder to a fluid bed reactor constructed from a coarse Buchner fritted glass funnel provided with gas inlet and outlet means and overflow discharge means. The fluid bed had a diameter of 44 mm and a depth of 89 mm.

Since the wet solids from the cell liquor carbonation were difficult to feed and fluidize, solids that had previously been dried and fluidized were mixed with the wet solids in a ratio of about 2 parts dry solids to 1 part wet solids. Fluid bed temperature was controlled by means of flexible heating tapes and a powerstat.

Chlorine gas containing varying amounts of water vapor was fed upwardly through the fluid bed reactor at a rate sufficient to maintain the bed in a fluidized condition. The exit gas from the fluid bed reactor was passed in a series through two absorbers made of glass columns packed with 12.7 mm Intalox saddles with about 2.54 to 5.08 cm of 6.35 mm Berly saddles at the top of the packing. Water was continuously circulated from the bottom of each absorber to the top via a Model TGS Sigmamotor pump and Tygon ® tubing. The first absorber was 81.3 cm in length with a 45 mm outside diameter and a packed section 45.7 cm in length. The second absorber was 102 cm in length with a 45 mm outside diameter and a packed section 71.1 cm in length.

The exit gas from the fluidized bed was introduced below the packed section of each absorber and passed countercurrently to the liquid flow. Unabsorbed gas was discharged from the top of the second absorber and either vented to a hood or recycled to the gas feed to the fluidized bed. The packed portion of each absorber was jacketed so that cooling water could be pumped around the absorbers. Ice water was circulated from a bucket via a centrifugal pump through the jacket of the second absorber and then through the jacket of the first absorber, the discharge from the first absorber being returned to the bucket. The temperature of the absorbing liquid in the first absorber was about 7° to 9° C. and in the second absorber was about 3° to 5° C.

A series of fluid bed runs were made ranging in duration from 60 to 720 minutes and at a fluid bed temperature ranging from 47° C. to 68° C. The results of said runs are summarized in Table I.

TABLE I

Chlorination of Sodium Sesquicarbonate In A Fluidized Bed

| Run | Feed Rate, gram/min. Solids | Chlorine | Water Vapor | Mole Ratio $H_2O/Cl_2$ | % $Cl_2$ Recovered as HClO |
|---|---|---|---|---|---|
| 1 | 1.38 | 1.69 | 0.15 | 0.17 | 25.9 |
| 2 | 1.30 | 1.69 | 0.155 | 0.18 | 18.6 |
| 3 | 1.48 | 1.61 | 0.16 | 0.20 | 27.9 |
| 4 | 2.02 | 0.43 | 0.09 | 0.41 | 61.6 |
| 5 | 2.19 | 0.43 | 0.10 | 0.46 | 59.5 |
| 6 | 1.84 | 0.32 | 0.09 | 0.56 | 63.1 |
| 7 | 1.48 | 0.36 | 0.10 | 0.56 | 68.5 |
| 8 | 1.89 | 0.2 | 0.09 | 0.61 | 80.0 |
| 9 | 1.94 | 0.31 | 0.10 | 0.64 | 77.1 |
| 10 | 1.68 | 0.30 | 0.10 | 0.67 | 85.2 |
| 11 | 2.09 | 0.28 | 0.10 | 0.71 | 85.8 |
| 12 | 1.05 | 0.23 | 0.095 | 0.82 | 81.6 |
| 13 | 1.66 | 0.28 | 0.15 | 1.05 | 66.2 |

Although the invention has been described with specific references and specific details of embodiments thereof, it is to be understood that it is not intended to be so limited since changes and alterations therein may be made by those skilled in the art which are within the full intended scope of this invention as defined by the appended claims.

We claim:

1. A continuous process for preparing hypochlorous acid comprising the steps of:
    (a) contacting cathode cell liquor with carbon dioxide containing gas to produce a wet, hydrated sodium carbonate-sodium bicarbonate precipitate;
    (b) feeding the wet precipitate to a fluid bed reactor and contacting the precipitate with a countercurrent flow of a mixture of gaseous chlorine and water vapor at a rate sufficient to maintain the bed of precipitate in a fluidized condition, where the molar ratio of water vapor to chlorine gas in the mixture fed to the fluid bed reactor is from about 0.5:1 to 0.9:1;
    (c) recycling a portion of precipitate that had been dried by contact with the gaseous mixture and mixing said portion with wet precipitate being fed to the fluid bed reactor; and
    (d) absorbing the gaseous effluent from the fluid bed reactor in water.

2. The process of claim 1 wherein the molar ratio of water vapor to chlorine gas in the mixture feed to the fluid bed reactor is from about 0.6:1 to 0.8:1.

3. The process of claim 1 wherein the weight ratio of dry precipitate recycled from the fluid bed reactor to wet precipitate being fed to the fluid bed reactor is at least about 2 to 1.

4. The process of claim 1 including the step of recyclying an additional portion of precipitate that had been dried by contact with the gaseous mixture and mixing said additional portion with the cathode cell liquor undergoing carbonation.

5. The process of claim 1 wherein the weight ratio of cell liquor to recycled precipitate is from about 2.5:1 to about 10:1.

6. The process of claim 5 wherein the weight ratio of cell liquor to recycled precipitate is about 5:1.

* * * * *